United States Patent
Miao

(10) Patent No.: US 12,143,225 B2
(45) Date of Patent: Nov. 12, 2024

(54) ENHANCED HARQ FEEDBACK FOR RELIABLE COMMUNICATIONS

(71) Applicant: APPLE INC., Cupertino, CA (US)

(72) Inventor: Honglei Miao, Munich (DE)

(73) Assignee: APPLE INC., Cupertino, CA (US)

(*) Notice: Subject to any disclaimer, the term of this patent is extended or adjusted under 35 U.S.C. 154(b) by 805 days.

(21) Appl. No.: 17/265,473

(22) PCT Filed: Aug. 8, 2019

(86) PCT No.: PCT/US2019/045647
§ 371 (c)(1),
(2) Date: Feb. 2, 2021

(87) PCT Pub. No.: WO2020/033640
PCT Pub. Date: Feb. 13, 2020

(65) Prior Publication Data
US 2021/0297192 A1  Sep. 23, 2021

Related U.S. Application Data

(60) Provisional application No. 62/717,542, filed on Aug. 10, 2018.

(51) Int. Cl.
*H04L 1/1825* (2023.01)
*H04L 1/1812* (2023.01)
*H04W 72/12* (2023.01)
*H04W 72/21* (2023.01)
*H04W 72/23* (2023.01)

(52) U.S. Cl.
CPC .......... *H04L 1/1825* (2013.01); *H04L 1/1812* (2013.01); *H04W 72/12* (2013.01); *H04W 72/21* (2023.01); *H04W 72/23* (2023.01)

(58) Field of Classification Search
CPC ... H04L 1/1825; H04L 1/1812; H04L 1/1671; H04L 5/0051; H04L 1/08; H04L 5/0055; H04W 72/12; H04W 72/21; H04W 72/23
See application file for complete search history.

(56) References Cited

U.S. PATENT DOCUMENTS

| 2015/0181576 | A1 | 6/2015 | Papasakellariou et al. |
| 2016/0226649 | A1* | 8/2016 | Papasakellariou .... H04L 5/0057 |
| 2017/0118747 | A1 | 4/2017 | Alvarino et al. |
| 2018/0324774 | A1* | 11/2018 | You ................... H04W 72/0446 |

(Continued)

FOREIGN PATENT DOCUMENTS

| AU | 2014201577 A1 | 4/2014 |
| CN | 105850058 A | 8/2016 |

(Continued)

OTHER PUBLICATIONS

PCT/US2019/045647, International Search Report and Written Opinion, Nov. 26, 2109, 11 pages.

*Primary Examiner* — Kibrom T Hailu
(74) *Attorney, Agent, or Firm* — Dorsey & Whitney LLP

(57) ABSTRACT

Systems and methods provide for enhanced HARQ-ACK feedback for PDSCH repetition transmission. A UE is configured to provide feedback ACK for PDSCH with repetitions less than scheduled repetition numbers. In response, the network adapts the PDSCH repetition numbers according to the channel condition to further optimize the overall system spectrum efficiency.

20 Claims, 9 Drawing Sheets

(56) References Cited

U.S. PATENT DOCUMENTS

| | | | | |
|---|---|---|---|---|
| 2019/0082351 A1* | 3/2019 | Nammi | ................ | H04L 1/1858 |
| 2021/0028889 A1* | 1/2021 | Stathakis | ................ | H04L 1/189 |
| 2021/0099255 A1* | 4/2021 | Gao | ........................ | H04L 1/16 |
| 2021/0259004 A1* | 8/2021 | Takeda | ...................... | H04L 1/08 |

FOREIGN PATENT DOCUMENTS

| | | |
|---|---|---|
| CN | 107624227 A | 1/2018 |
| EP | 3249993 A1 | 11/2017 |
| KR | 1020150108348 A | 9/2015 |
| WO | 2015093907 A1 | 6/2015 |
| WO | 2016190796 A1 | 12/2016 |
| WO | 2017031675 A1 | 3/2017 |

* cited by examiner ic # ENHANCED HARQ FEEDBACK FOR RELIABLE COMMUNICATIONS

CROSS-REFERENCE TO RELATED APPLICATION(S)

This application is a national stage filing under 35 U.S.C. § 371 of International Patent Application No. PCT/US2019/045647, filed Aug. 8, 2019, which claims the benefit of U.S. Provisional Application No. 62/717,542, filed Aug. 10, 2018, each of which is hereby incorporated by reference herein in its entirety.

TECHNICAL FIELD

This application relates generally to wireless communication systems, and more specifically to hybrid automatic repeat request (HARQ) in new radio (NR) systems.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANS, RAN Nodes can include a 5G Node, new radio (NR) node or g Node B (gNB).

DETAILED DESCRIPTION

I. Introduction

Figure 1:
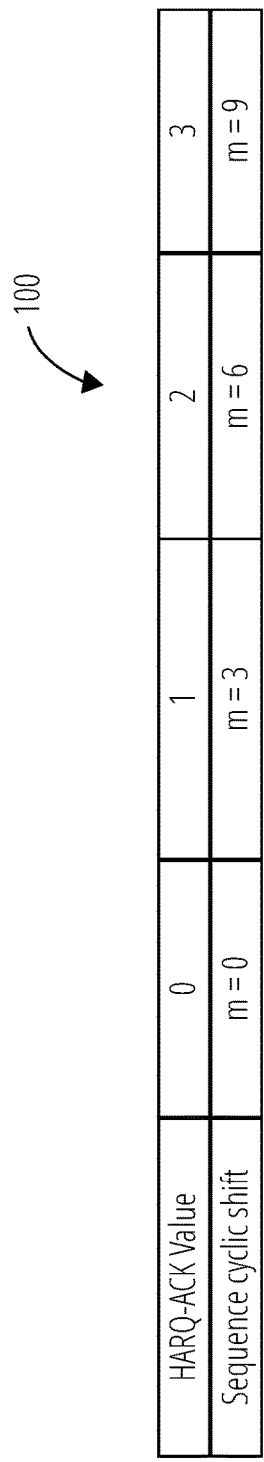
FIG. 1 illustrates a four-value HARQ mapping in accordance with one embodiment.

To support enhanced reliability focusing on 1ms latency bound in LTE, only certain techniques are currently used or are being considered for use. For example, for Physical Control Format Indicator Channel (PCFICH) reliability, semi-static configuration of PCFICH duration to avoid PCFICH reliability impacting the overall downlink (DL) reliability is being developed. Blind/HARQ-less repetition for scheduled Downlink Shared Channel (DL-SCH) operation is also being studied. Specifically, by virtue of legacy short/extended (S/E) physical downlink control channel (PDCCH) and short (S) physical uplink control channel (PUCCH) formats (if applicable), any potential downlink control information (DCI) modifications are limited to support of blind/HARQ-less repetition.

In embodiments, PDCCH indicates the number of physical downlink shared channel (PDSCH) transmissions associated with the PDCCH. PDSCH transmissions can be soft combined after a PDCCH is successfully received. The number of transmissions, k, is the number of PDSCH transmissions associated with the PDCCH starting with the current transmission time interval (TTI). The UE may discard any PDSCH assignment for a (s)TTI in a serving cell with cyclic redundancy check (CRC) scrambled with Cell Radio Network Temporary Identifier (C-RNTI), if PDSCH using blind repetition is being received in that (s)TTI in the same serving cell. In some embodiments, for PDSCH repetition, a field of two bits is amended to the PDSCH related DCI. Blind/HARQ-less PDSCH repetitions are enabled by RRC configuration. For slot/subslot PDSCH repetition, the rate-matching around short PDCCH (SPDCCH) resources for the PDSCH transmissions within a repetition window follows the rate-matching around SPDCCH resources for the first PDSCH transmission of the repetition window. For TM10 blind/HARQ-less PDSCH repetition, the UE assumes the same quasi-colocation indicator (PQI) to be applied to all PDSCH repetitions.

PDSCH repetitions associated with a single downlink (DL) assignment assume the same resource block (RB) allocation. For slot/subslot PDSCH repetition and demodulation reference signal (DMRS) based PDSCH, the UE may assume that the same precoder is kept between PDSCH repetitions. For time division duplex (TDD), the UE cannot assume coherent DMRS channel estimation across an uplink (UL)/DL switching point. This allows the UE to do coherent channel estimation filtering. For subslot PDSCH repetitions, DMRS sharing is not supported for blind/HARQ-less PDSCH repetition with k >1, i.e., DMRS is present in each subslot. For slot/subslot PDSCH, with k >1, the maximum transmission rank is two for reception of PDSCH. For PDSCH repetitions, different redundancy version (RV) can be used in different PDSCH transmissions within the repetition window. For PDSCH repetitions and RV cycling which can be configured by higher layer signaling and selected between {0, 0, 0, 0} or {0, 2, 3, 1}, the RV field in the DCI scheduling a repetition sequence of k PDSCH transmissions identifies the starting RV in the cycling sequence that is used for the first transmission of PDSCH within the repetition window. For HARQ for repeated PDSCH transmissions, the UE may report HARQ feedback with the timing given by the last PDSCH repetition.

Embodiments herein include methods for enhanced HARQ-acknowledgement (ACK) feedback for PDSCH repetition transmission. In particular, the disclosed methods enable a UE to feedback ACK for PDSCH with repetitions less than the scheduled repetition numbers. This helps the network to adapt the PDSCH repetition numbers according to the channel condition to further optimize the overall system spectrum efficiency.

Embodiments herein include enhanced HARQ-ACK feedback for PDSCH repetition transmissions, whereby a UE can signal HARQ-ACK for PDSCH with a repetition number smaller than the scheduled repetition number. Specifically, certain embodiments enable the network to realize the different multi-value HARQ-ACK feedback for PDSCH with repetition.

In one embodiment, multi-value HARQ-ACK feedback is provided for a number of repetitions. In certain such embodiments, multi-value HARQ-ACK feedback enable a UE to feedback the ACK response achieved by the smallest number of repetitions in the current scheduled data.

In another embodiment, multi-value HARQ-ACK feedback is provided for partial reception of scheduled PDSCH. In certain such embodiments, a UE can feedback the HARQ-ACK message corresponding to the partial reception of the scheduled data. Such embodiments may be applied, for example, for implicit repetition data scheduling.

In another embodiment, a multi-value HARQ-ACK feedback configuration is used for PDSCH with repetition. Certain such embodiments can be used by a gNB, for example, to configure a UE to realize multi-value HARQ-ACK feedback.

Another embodiment uses dynamic signaling of data transmission with repetitions. Certain such embodiments enable a gNB to dynamically schedule the data with a different number of repetitions to better adapt the transmission according to the channel condition.

Embodiments herein may include methods to enable multi-value HARQ-ACK feedback for data transmission with repetitions. Based on the enhanced HARQ-ACK feedback, a gNB can properly adapt the repetition number according to the channel condition so that better overall system spectrum efficiency can be achieved.

II. Enhanced HARQ Feedback for PDSCH Repetition Transmission

In legacy HARQ feedback for the PDSCH repetition transmission, the UE may provide ACK/negative acknowledgement (NACK) after the last PDSCH repetition is received. In case of better channel condition than what the gNB assumes, the UE may correctly decode the PDSCH earlier than all the repetitions are received. For example, if the gNB schedules a PDSCH with four repetitions, assuming a good channel condition, the UE may correctly decode the PDSCH by using only the first two repetitions. When the UE feeds back the ACK response to the gNB, it may be beneficial that the UE signals the smallest number of repetitions which are sufficient for the UE to achieve the correct PDSCH decoding. This indication may help the gNB to apply a suitable number of repetitions in order to avoid an unnecessarily excessive resource allocation for PDSCH transmission. Thus, the following enhanced HARQ feedback methods are disclosed.

(A) Multi-Value HARQ-ACK Feedback with a Number of Repetitions

In one embodiment, when the UE provides feedback of an ACK response to the gNB, the UE can also signal the number of repetitions it actually employed to achieve the correct decoding. For example, if four repetitions are scheduled for PDSCH transmission, the following HARQ-value mapping can be used for HARQ feedback:
   0: NACK
   1: ACK with 1 transmission/repetition
   2: ACK with 2 transmissions/repetitions
   3: ACK with 4 transmissions/repetition With the above example mapping, the UE may be configured with at least four PUCCH sequences so that each of them represents a particular HARQ value. At the receiver side, the gNB may detect which particular ACK sequence is received.

The single RB based NR PUCCH format 0 can be used to feedback up to 2 bits HARQ response value. As such, the PUCCH format 0 can be used to convey the above proposed multiple-value HARQ feedback for PDSCH with repetitions.

For example, FIG. 1 illustrates a four-value HARQ mapping 100 of HARQ-ACK bits to sequences according to one embodiment. In FIG. 1, m defines the cyclic shift value of the PUCCH format 0 sequence.

If a smaller number of PUCCH sequences are desired for such multiple-value HARQ feedback, the following ACK/NACK value mapping can be used for certain embodiments:
   0: NACK
   1: ACK with at least 2 transmission/repetition.
   2: ACK with at least 4 transmissions/repetitions With the above mapping example, the UE is configured with only three PUCCH sequences, which reduces the gNB PUCCH receiver complexity and potentially improves the PUCCH coverage performance.

Figure 2:
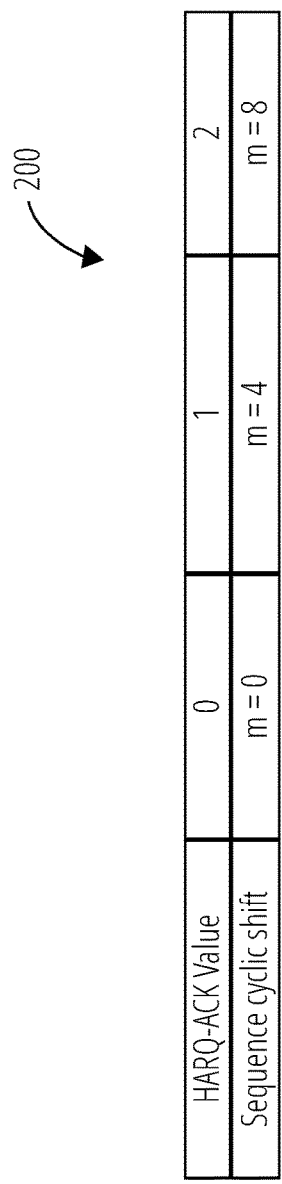
FIG. 2 illustrates a three-value HARQ mapping in accordance with one embodiment.

FIG. 2 illustrates a three-value HARQ mapping 200 of HARQ-ACK bits to sequences according to one embodiment. Again, m in FIG. 2 defines the cyclic shift value of the PUCCH format 0 sequence.

(B) Multi-Value HARQ-ACK Feedback with Partial Reception of Scheduled PDSCH

In NR, for PDSCH with data mapping type B, i.e., whereby the scheduled PDSCH is not aligned with the slot boundary, PDSCH can be scheduled up to fourteen orthogonal frequency division multiplexing (OFDM) symbols not starting from the beginning of the slot boundary. For mini-slot based scheduling, e.g., two OS based mini-slot, a PDSCH with four repetitions can be scheduled by mini-slot based PDCCH scheduling a single PDSCH spanning several mini-slots which correspond to total time duration of several repetitions. To enable ACK response for different effective code rates to help the network determine proper code rate, similar to an embodiment discussed above, the following multiple-value ACK/NACK response can be defined for a first option:
   0: NACK
   1: ACK with 1/4 reception of PDSCH
   2: ACK with 1/2 reception of PDSCH
   3: ACK with full reception of PDSCH In another embodiment, the following multiple-value ACK/NACK response can be defined for a second option:
   0: NACK
   1: ACK with 1/2 reception of PDSCH
   3: ACK with full reception of PDSCH In certain embodiments, the above two options can be signaled by multi-value based HARQ feedback with the mappings shown in FIG. 1 and FIG. 2.

(C) Multi-Value HARQ-ACK Feedback Configuration for PDSCH with Repetition

To enable the multi-value HARQ-ACK feedback for PDSCH with repetition, radio resource control (RRC) based signaling can be used. In one embodiment, a RRC parameter PDSCH-MultipValueHARQPerTBFeedback can be defined as follows:
   PDSCH-NbrHARQValuesPerTBFeedback:={'n2', 'n3', 'n4' }, where 'n2' refers to 2-value HARQ feedback, which corresponds to the traditional 1 bit HARQ feedback, 'n3' for the 3-value HARQ feedback, and 'n4' for 4-value HARQ feedback.

(D) Dynamic Signaling of Data Transmission with Repetitions

In certain NR embodiments, the PDSCH and PUSCH with repetitions can be semi-statically configured with RRC signaling. As a result, if the UE wants to change the number of repetitions for scheduled data, the RRC reconfiguration is performed. This may cause a large signaling overhead, and adaptation of the number of repetitions according to the momentary channel conditions can not be flexibly and quickly achieved. Therefore, it may be beneficial to enable dynamic scheduling of different numbers of repetitions for each data transmission according to the latest channel state information (DCI) from the UE. To this end, the UE can be configured with a maximum or predetermined number of repetitions for each data scheduling by RRC signaling, and an exact number of repetitions for the scheduled data can be signaled by the PDCCH scheduling the data. In one embodiment, the DCI can signal the number of repetitions which is not more than the configured maximum of repetitions, for the scheduled data. In another embodiment, to save the DCI signaling overhead, the following reduced signaling overhead approaches can be used as well.

Figure 3:
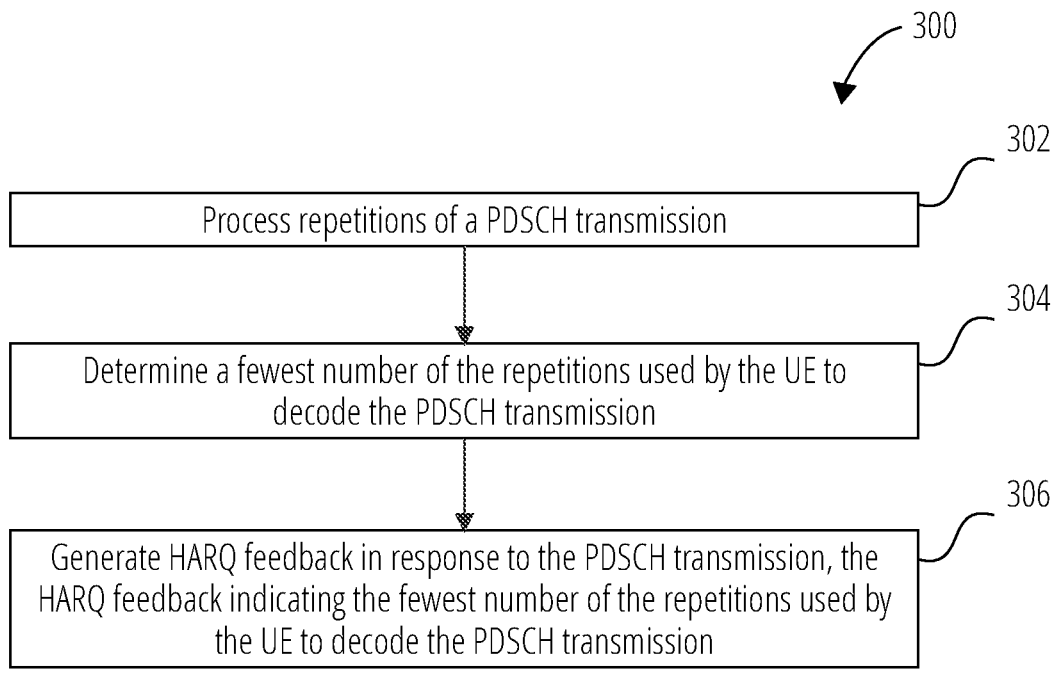
FIG. 3 illustrates a method in accordance with one embodiment.

For example, the 1-bit repetition bit field in DCI can have the following meanings:
0: repetitions with half of the configured maximum repetition number
1: repetitions with the configured maximum repetition number As another example, the 2-bit repetition bit field in DCI can have the following meanings:
0: repetitions with 1/4 of the configured maximum repetition number
1: repetitions with half of the configured maximum repetition number
2: repetitions with the configured maximum repetition number III. Example Methods FIG. 3 illustrates a method 300 for a UE according to one embodiment. In block 302, the method 300 processes repetitions of a PDSCH transmission. In block 304, the method 300 determines a fewest number of the repetitions used by the UE to decode the PDSCH transmission. In block 306, the method 300 generates HARQ feedback in response to the PDSCH transmission, the HARQ feedback indicating the fewest number of the repetitions used by the UE to decode the PDSCH transmission.

Figure 4:
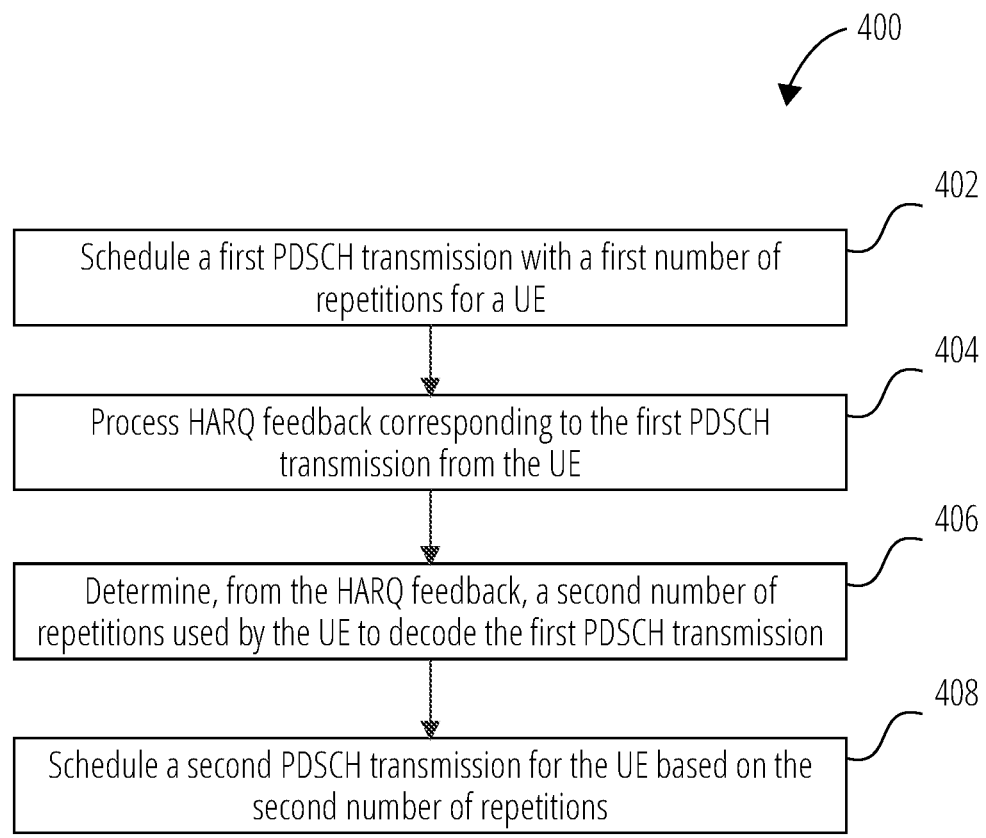
FIG. 4 illustrates a method in accordance with one embodiment.

FIG. 4 illustrates a method 400 for a node in a wireless network according to one embodiment. In block 402, the method 400 schedules a first physical downlink shared channel (PDSCH) transmission with a first number of repetitions for a user equipment (UE). In block 404, the method 400 processes hybrid automatic repeat request (HARQ) feedback corresponding to the first PDSCH transmission from the UE. In block 406, the method 400 determines, from the HARQ feedback, a second number of repetitions used by the UE to decode the first PDSCH transmission. In block 408, the method 400 schedules a second PDSCH transmission for the UE based on the second number of repetitions.

IV. Example Systems and Devices

Certain systems and devices or apparatus described below may be configured according to the embodiments described above. For example, certain UEs (or an apparatus for a UE or a baseband processor for a UE) or certain nodes (or a gNB or apparatus or processor for a gNB) described below may be configured to perform the methods shown in FIG. 3 or FIG. 4, or to provide any of the other embodiments described herein.

Figure 5:
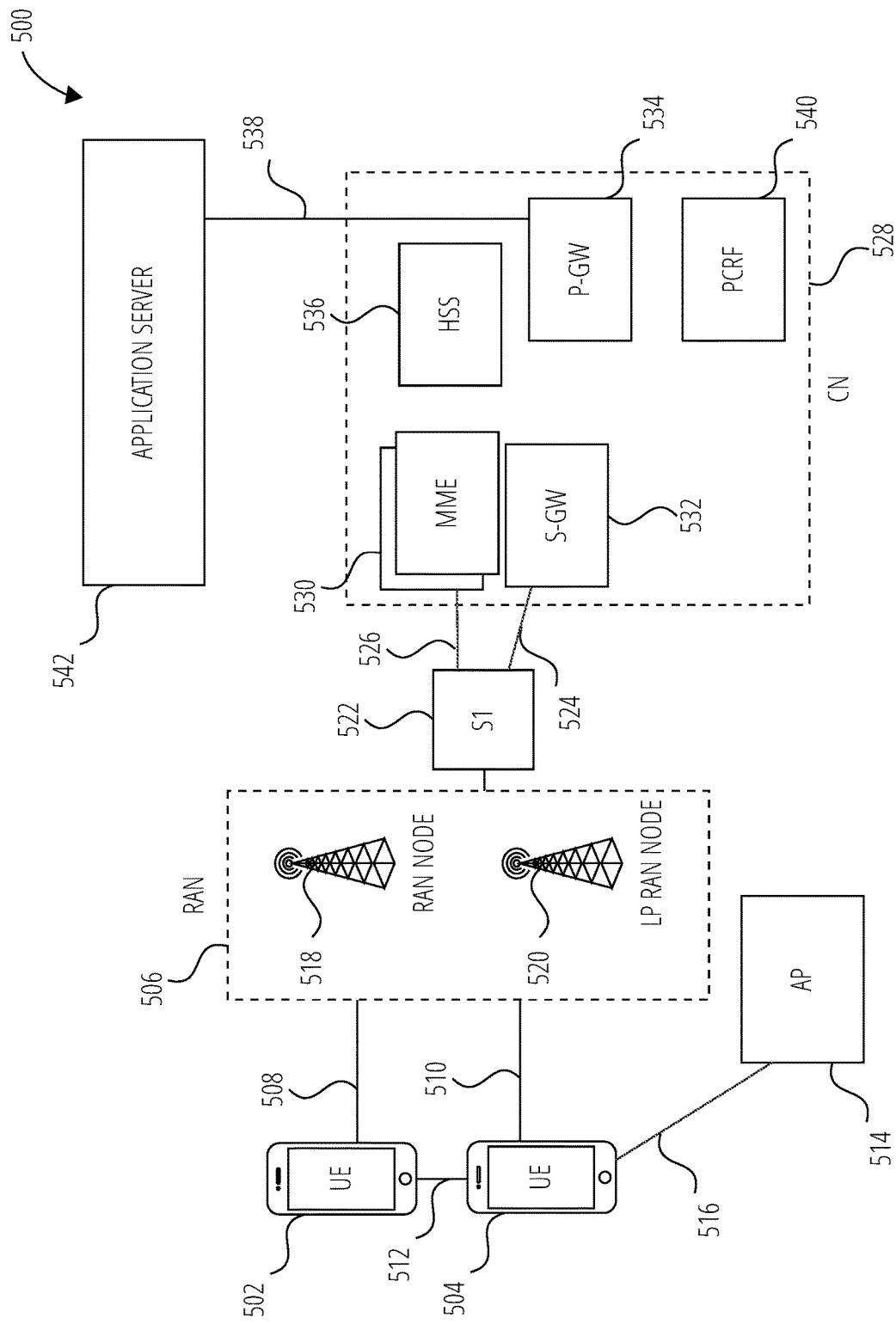
FIG. 5 illustrates a system in accordance with one embodiment.

FIG. 5 illustrates an architecture of a system 500 of a network in accordance with some embodiments. The system 500 includes one or more user equipment (UE), shown in this example as a UE 502 and a UE 504. The UE 502 and the UE 504 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 502 and the UE 504 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 502 and the UE 504 may be configured to connect, e.g., communicatively couple, with a radio access network (RAN), shown as RAN 506. The RAN 506 may be, for example, an Evolved Universal Mobile Telecommunications System (UMTS) Terrestrial Radio Access Network (E-UTRAN), a NextGen RAN (NG RAN), or some other type of RAN. The UE 502 and the UE 504 utilize connection 508 and connection 510, respectively, each of which comprises a physical communications interface or layer (discussed in further detail below); in this example, the connection 508 and the connection 510 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 502 and the UE 504 may further directly exchange communication data via a ProSe interface 512. The ProSe interface 512 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 504 is shown to be configured to access an access point (AP), shown as AP 514, via connection 516. The connection 516 can comprise a local wireless connection, such as a connection consistent with any IEEE 802.11 protocol, wherein the AP 514 would comprise a wireless fidelity (WiFi®) router. In this example, the AP 514 may be connected to the Internet without connecting to the core network of the wireless system (described in further detail below).

The RAN 506 can include one or more access nodes that enable the connection 508 and the connection 510. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 506 may include one or more RAN nodes for providing macrocells, e.g., macro RAN node 518, and one or more RAN nodes for providing femtocells or picocells (e.g., cells having smaller coverage areas, smaller user capacity, or higher bandwidth compared to macrocells), e.g., a low power (LP) RAN node such as LP RAN node 520.

Any of the macro RAN node 518 and the LP RAN node 520 can terminate the air interface protocol and can be the first point of contact for the UE 502 and the UE 504. In some embodiments, any of the macro RAN node 518 and the LP RAN node 520 can fulfill various logical functions for the RAN 506 including, but not limited to, radio network controller (RNC) functions such as radio bearer management, uplink and downlink dynamic radio resource management and data packet scheduling, and mobility management.

In accordance with some embodiments, the UE 502 and the UE 504 can be configured to communicate using Orthogonal Frequency-Division Multiplexing (OFDM) communication signals with each other or with any of the macro RAN node 518 and the LP RAN node 520 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the macro RAN node 518 and the LP RAN node 520 to the UE 502 and the UE 504, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 502 and the UE 504. The physical downlink control channel (PDCCH) may carry information about the transport format and resource allocations related to the PDSCH channel, among other things. It may also inform the UE 502 and the UE 504 about the transport format, resource allocation, and H-ARQ (Hybrid Automatic Repeat Request) information related to the uplink shared channel. Typically, downlink scheduling (assigning control and shared channel resource blocks to the UE 504 within a cell) may be performed at any of the macro RAN node 518 and the LP RAN node 520 based on channel quality information fed back from any of the UE 502 and UE 504. The downlink resource assignment information may be sent on the PDCCH used for (e.g., assigned to) each of the UE 502 and the UE 504.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 506 is communicatively coupled to a core network (CN), shown as CN 528—via an S1 interface 522. In embodiments, the CN 528 may be an evolved packet core (EPC) network, a NextGen Packet Core (NPC) network, or some other type of CN. In this embodiment the S1 interface 522 is split into two parts: the S1-U interface 524, which carries traffic data between the macro RAN node 518 and the LP RAN node 520 and a serving gateway (S-GW), shown as S-GW 532, and an S1-mobility management entity (MME) interface, shown as S1-MME interface 526, which is a signaling interface between the macro RAN node 518 and LP RAN node 520 and the MME(s) 530.

In this embodiment, the CN 528 comprises the MME(s) 530, the S-GW 532, a Packet Data Network (PDN) Gateway (P-GW) (shown as P-GW 534), and a home subscriber server (HSS) (shown as HSS 536). The MME(s) 530 may be similar in function to the control plane of legacy Serving General Packet Radio Service (GPRS) Support Nodes (SGSN). The MME(s) 530 may manage mobility aspects in access such as gateway selection and tracking area list management. The HSS 536 may comprise a database for network users, including subscription-related information to support the network entities' handling of communication sessions. The CN 528 may comprise one or several HSS 536, depending on the number of mobile subscribers, on the capacity of the equipment, on the organization of the network, etc. For example, the HSS 536 can provide support for routing/roaming, authentication, authorization, naming/addressing resolution, location dependencies, etc.

The S-GW 532 may terminate the S1 interface 322 towards the RAN 506, and routes data packets between the RAN 506 and the CN 528. In addition, the S-GW 532 may be a local mobility anchor point for inter-RAN node handovers and also may provide an anchor for inter-3GPP mobility. Other responsibilities may include lawful intercept, charging, and some policy enforcement.

The P-GW 534 may terminate an SGi interface toward a PDN. The P-GW 534 may route data packets between the CN 528 (e.g., an EPC network) and external networks such as a network including the application server 542 (alternatively referred to as application function (AF)) via an Internet Protocol (IP) interface (shown as IP communications interface 538). Generally, an application server 542 may be an element offering applications that use IP bearer resources with the core network (e.g., UMTS Packet Services (PS) domain, LTE PS data services, etc.). In this embodiment, the P-GW 534 is shown to be communicatively coupled to an application server 542 via an IP communications interface 538. The application server 542 can also be configured to support one or more communication services (e.g., Voice-over-Internet Protocol (VOIP) sessions, PTT sessions, group communication sessions, social networking services, etc.) for the UE 502 and the UE 504 via the CN 528.

The P-GW 534 may further be a node for policy enforcement and charging data collection. A Policy and Charging Enforcement Function (PCRF) (shown as PCRF 540) is the policy and charging control element of the CN 528. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 540 may be communicatively coupled to the application server 542 via the P-GW 534. The application server 542 may signal the PCRF 540 to indicate a new service flow and select the appropriate Quality of Service (QOS) and charging parameters. The PCRF 540 may provision this rule into a Policy and Charging Enforcement Function (PCEF) (not shown) with the appropriate traffic flow template (TFT) and QoS class of identifier (QCI), which commences the QoS and charging as specified by the application server 542.

Figure 6:
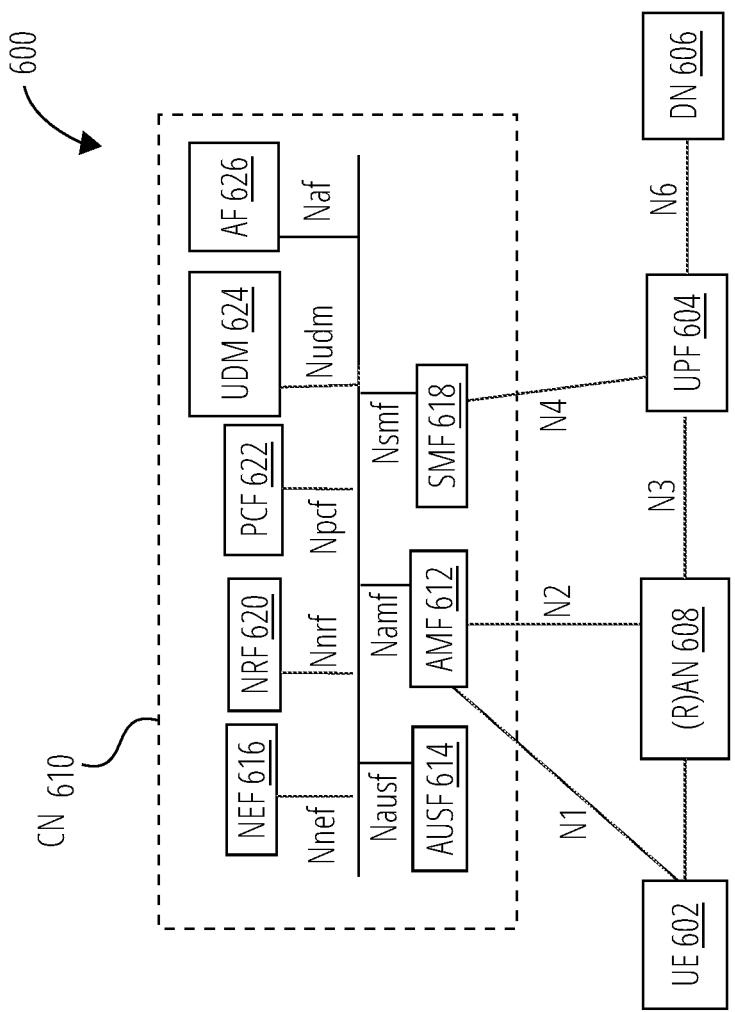
FIG. 6 illustrates a system in accordance with one embodiment.

FIG. 6 illustrates an architecture of a system 600 of a network in accordance with some embodiments. The system 600 is shown to include a UE 602, which may be the same or similar to the UE 502 and the UE 504 discussed previously; a 5G access node or RAN node (shown as (R)AN node 608), which may be the same or similar to the macro RAN node 518 and/or the LP RAN node 520 discussed previously; a User Plane Function (shown as UPF 604); a Data Network (DN 606), which may be, for example, operator services, Internet access or 3rd party services; and a 5G Core Network (5GC) (shown as CN 610).

The CN 610 may include an Authentication Server Function (AUSF 614); a Core Access and Mobility Management Function (AMF 612); a Session Management Function (SMF 618); a Network Exposure Function (NEF 616); a Policy Control Function (PCF 622); a Network Function (NF) Repository Function (NRF 620); a Unified Data Management (UDM 624); and an Application Function (AF 626). The CN 610 may also include other elements that are not shown, such as a Structured Data Storage network function (SDSF), an Unstructured Data Storage network function (UDSF), and the like.

The UPF 604 may act as an anchor point for intra-RAT and inter-RAT mobility, an external PDU session point of interconnect to DN 606, and a branching point to support multi-homed PDU session. The UPF 604 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 604 may include an uplink classifier to support routing traffic flows to a data network. The DN 606 may represent various network operator services, Internet access, or third party services. DN 606 may include, or be similar to the application server 542 discussed previously.

The AUSF 614 may store data for authentication of UE 602 and handle authentication related functionality. The AUSF 614 may facilitate a common authentication framework for various access types.

The AMF 612 may be responsible for registration management (e.g., for registering UE 602, etc.), connection management, reachability management, mobility management, and lawful interception of AMF-related events, and access authentication and authorization. AMF 612 may provide transport for SM messages for the SMF 618, and act as a transparent proxy for routing SM messages. AMF 612 may also provide transport for short message service (SMS) messages between UE 602 and an SMS function (SMSF) (not shown by FIG. 6). AMF 612 may act as Security Anchor Function (SEA), which may include interaction with the AUSF 614 and the UE 602, receipt of an intermediate key that was established as a result of the UE 602 authentication process. Where USIM based authentication is used, the AMF 612 may retrieve the security material from the AUSF 614. AMF 612 may also include a Security Context Management (SCM) function, which receives a key from the SEA that it uses to derive access-network specific keys. Furthermore, AMF 612 may be a termination point of RAN CP interface (N2 reference point), a termination point of NAS (NI) signaling, and perform NAS ciphering and integrity protection.

AMF 612 may also support NAS signaling with a UE 602 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 602 and AMF 612, and relay uplink and downlink user-plane packets between the UE 602 and UPF 604. The N3IWF also provides mechanisms for IPsec tunnel establishment with the UE 602.

The SMF 618 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 618 may include the following roaming functionality: handle local enforcement to apply QOS SLAs (VPLMN); charging data collection and charging interface (VPLMN); lawful intercept (in VPLMN for SM events and interface to LI System); support for interaction with external DN for transport of signaling for PDU session authorization/authentication by external DN.

The NEF 616 may provide means for securely exposing the services and capabilities provided by 3GPP network functions for third party, internal exposure/re-exposure, Application Functions (e.g., AF 626), edge computing or fog computing systems, etc. In such embodiments, the NEF 616 may authenticate, authorize, and/or throttle the AFs. NEF 616 may also translate information exchanged with the AF 626 and information exchanged with internal network functions. For example, the NEF 616 may translate between an AF-Service-Identifier and an internal 5GC information. NEF 616 may also receive information from other network functions (NFs) based on exposed capabilities of other network functions. This information may be stored at the NEF 616 as structured data, or at a data storage NF using a standardized interfaces. The stored information can then be re-exposed by the NEF 616 to other NFs and AFs, and/or used for other purposes such as analytics.

The NRF 620 may support service discovery functions, receive NF Discovery Requests from NF instances, and provide the information of the discovered NF instances to the NF instances. NRF 620 also maintains information of available NF instances and their supported services.

The PCF 622 may provide policy rules to control plane function(s) to enforce them, and may also support unified policy framework to govern network behavior. The PCF 622 may also implement a front end (FE) to access subscription information relevant for policy decisions in a UDR of UDM 624.

The UDM 624 may handle subscription-related information to support the network entities' handling of communication sessions, and may store subscription data of UE 602. The UDM 624 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 622. UDM 624 may also support SMS management, wherein an SMS-FE implements the similar application logic as discussed previously.

The AF 626 may provide application influence on traffic routing, access to the Network Capability Exposure (NCE), and interact with the policy framework for policy control. The NCE may be a mechanism that allows the 5GC and AF 626 to provide information to each other via NEF 616, which may be used for edge computing implementations. In such implementations, the network operator and third party services may be hosted close to the UE 602 access point of attachment to achieve an efficient service delivery through the reduced end-to-end latency and load on the transport network. For edge computing implementations, the 5GC may select a UPF 604 close to the UE 602 and execute traffic steering from the UPF 604 to DN 606 via the N6 interface. This may be based on the UE subscription data, UE location, and information provided by the AF 626. In this way, the AF 626 may influence UPF (re)selection and traffic routing. Based on operator deployment, when AF 626 is considered to be a trusted entity, the network operator may permit AF 626 to interact directly with relevant NFs.

As discussed previously, the CN 610 may include an SMSF, which may be responsible for SMS subscription checking and verification, and relaying SM messages to/from the UE 602 to/from other entities, such as an SMS-GMSC/IWMSC/SMS-router. The SMS may also interact with AMF 612 and UDM 624 for notification procedure that the UE 602 is available for SMS transfer (e.g., set a UE not reachable flag, and notifying UDM 624 when UE 602 is available for SMS).

The system 600 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 600 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 610 may include an Nx interface, which is an inter-CN interface between the MME (e.g., MME(s) 530) and the AMF 612 in order to enable interworking between CN 610 and CN 528.

Although not shown by FIG. 6, the system 600 may include multiple RAN nodes (such as (R)AN node 608) wherein an Xn interface is defined between two or more (R)AN node 608 (e.g., gNBs and the like) that connecting to 5GC 410, between a (R)AN node 608 (e.g., gNB) connecting to CN 610 and an eNB (e.g., a macro RAN node 518 of FIG. 5), and/or between two eNBs connecting to CN 610.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 602 in a connected mode (e.g., CM-CONNECTED) including functionality to manage the UE mobility for connected mode between one or more (R)AN node 608. The mobility support may include context transfer from an old (source) serving (R)AN node 608 to new (target) serving (R)AN node 608; and control of user plane tunnels between old (source) serving (R)AN node 608 to new (target) serving (R)AN node 608.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 7:
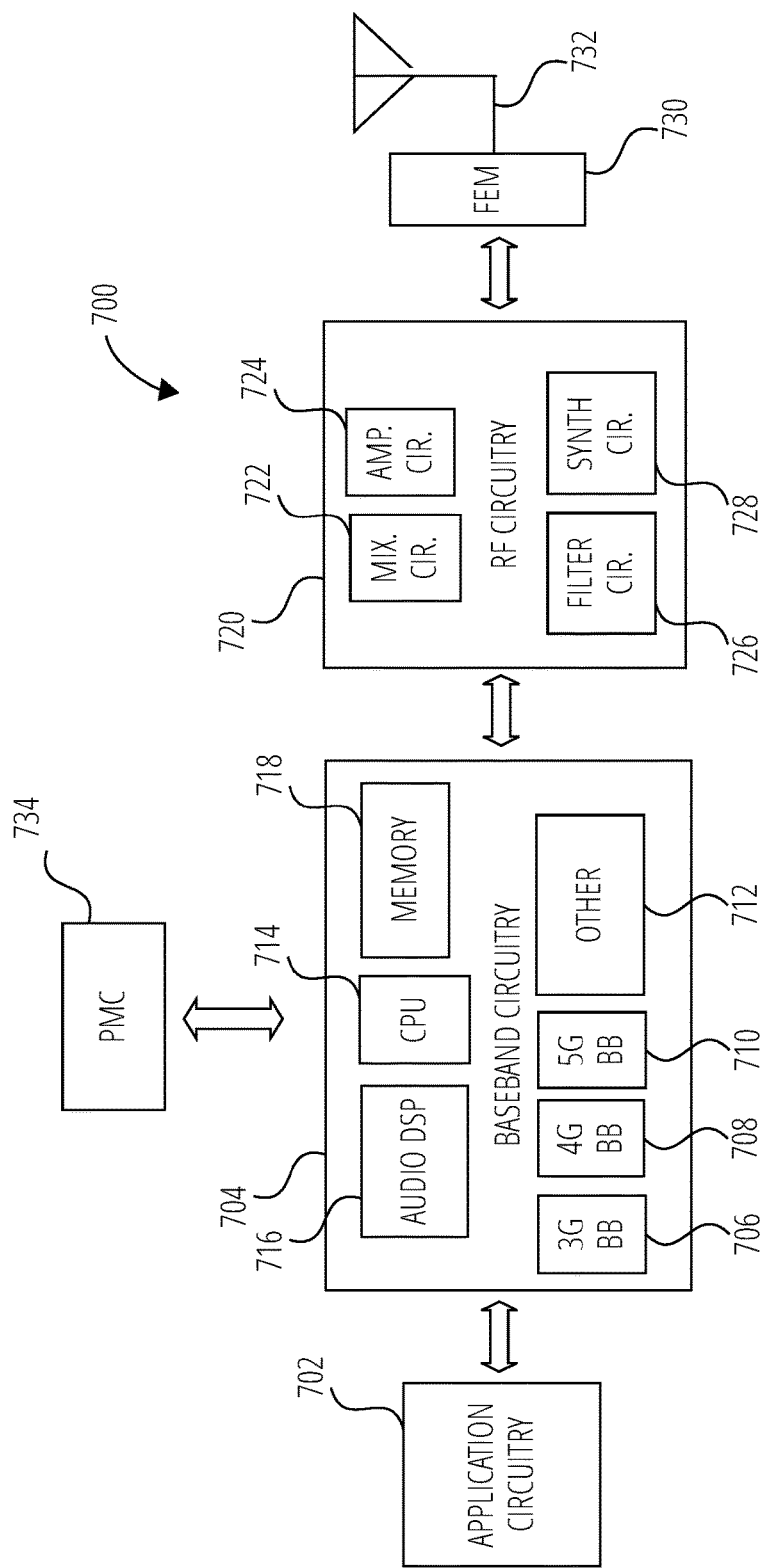
FIG. 7 illustrates a device in accordance with one embodiment.

FIG. 7 illustrates example components of a device 700 in accordance with some embodiments. In some embodiments, the device 700 may include application circuitry 702, baseband circuitry 704, Radio Frequency (RF) circuitry (shown as RF circuitry 720), front-end module (FEM) circuitry (shown as FEM circuitry 730), one or more antennas 732, and power management circuitry (PMC) (shown as PMC 734) coupled together at least as shown. The components of the illustrated device 700 may be included in a UE or a RAN node. In some embodiments, the device 700 may include fewer elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 720 and to generate baseband signals for a transmit signal path of the RF circuitry 720. The baseband circuitry 704 may interface with the application circuitry 702 for generation and processing of the baseband signals and for controlling operations of the RF circuitry 720. For example, in some embodiments, the baseband circuitry 704 may include a third generation (3G) baseband processor (3G baseband processor 706), a fourth generation (4G) baseband processor (4G baseband processor 708), a fifth generation (5G) baseband processor (5G baseband processor 710), or other baseband processor(s) 712 for other existing generations, generations in development or to be developed in the future (e.g., second generation (2G), sixth generation (6G), etc.). The baseband circuitry 704 (e.g., one or more of baseband processors) may handle various radio control functions that enable communication with one or more radio networks via the RF circuitry 720. In other embodiments, some or all of the functionality of the illustrated baseband processors may be included in modules stored in the memory 718 and executed via a Central Processing Unit (CPU 714). The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include a digital signal processor (DSP), such as one or more audio DSP(s) 716. The one or more audio DSP(s) 716 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 704 is configured to support radio communications of more than one wireless protocol may be referred to as multi-mode baseband circuitry.

The RF circuitry 720 may enable communication with wireless networks using modulated electromagnetic radiation through a non-solid medium. In various embodiments, the RF circuitry 720 may include switches, filters, amplifiers, etc. to facilitate the communication with the wireless network. The RF circuitry 720 may include a receive signal path which may include circuitry to down-convert RF signals received from the FEM circuitry 730 and provide baseband signals to the baseband circuitry 704. The RF circuitry 720 may also include a transmit signal path which may include circuitry to up-convert baseband signals provided by the baseband circuitry 704 and provide RF output signals to the FEM circuitry 730 for transmission.

In some embodiments, the receive signal path of the RF circuitry 720 may include mixer circuitry 722, amplifier circuitry 724 and filter circuitry 726. In some embodiments, the transmit signal path of the RF circuitry 720 may include filter circuitry 726 and mixer circuitry 722. The RF circuitry 720 may also include synthesizer circuitry 728 for synthesizing a frequency for use by the mixer circuitry 722 of the receive signal path and the transmit signal path. In some embodiments, the mixer circuitry 722 of the receive signal path may be configured to down-convert RF signals received from the FEM circuitry 730 based on the synthesized frequency provided by synthesizer circuitry 728. The amplifier circuitry 724 may be configured to amplify the down-converted signals and the filter circuitry 726 may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, the mixer circuitry 722 of the receive signal path may comprise passive mixers, although the scope of the embodiments is not limited in this respect.

In some embodiments, the mixer circuitry 722 of the transmit signal path may be configured to up-convert input baseband signals based on the synthesized frequency provided by the synthesizer circuitry 728 to generate RF output signals for the FEM circuitry 730. The baseband signals may be provided by the baseband circuitry 704 and may be filtered by the filter circuitry 726.

In some embodiments, the mixer circuitry 722 of the receive signal path and the mixer circuitry 722 of the transmit signal path may include two or more mixers and may be arranged for quadrature downconversion and upconversion, respectively. In some embodiments, the mixer circuitry 722 of the receive signal path and the mixer circuitry 722 of the transmit signal path may include two or more mixers and may be arranged for image rejection (e.g., Hartley image rejection). In some embodiments, the mixer circuitry 722 of the receive signal path and the mixer circuitry 722 may be arranged for direct downconversion and direct upconversion, respectively. In some embodiments, the mixer circuitry 722 of the receive signal path and the mixer circuitry 722 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 720 may include analog-to-digital converter (ADC) and digital-to-analog converter (DAC) circuitry and the baseband circuitry 704 may include a digital baseband interface to communicate with the RF circuitry 720.

In some dual-mode embodiments, a separate radio IC circuitry may be provided for processing signals for each spectrum, although the scope of the embodiments is not limited in this respect.

In some embodiments, the synthesizer circuitry 728 may be a fractional-N synthesizer or a fractional N/N+1 synthesizer, although the scope of the embodiments is not limited in this respect as other types of frequency synthesizers may be suitable. For example, synthesizer circuitry 728 may be a delta-sigma synthesizer, a frequency multiplier, or a synthesizer comprising a phase-locked loop with a frequency divider.

The synthesizer circuitry 728 may be configured to synthesize an output frequency for use by the mixer circuitry 722 of the RF circuitry 720 based on a frequency input and a divider control input. In some embodiments, the synthesizer circuitry 728 may be a fractional N/N+1 synthesizer.

In some embodiments, frequency input may be provided by a voltage controlled oscillator (VCO), although that is not a requirement. Divider control input may be provided by either the baseband circuitry 704 or the application circuitry 702 (such as an applications processor) depending on the desired output frequency. In some embodiments, a divider control input (e.g., N) may be determined from a look-up table based on a channel indicated by the application circuitry 702.

Synthesizer circuitry 728 of the RF circuitry 720 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 728 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 720 may include an IQ/polar converter.

The FEM circuitry 730 may include a receive signal path which may include circuitry configured to operate on RF signals received from one or more antennas 732, amplify the received signals and provide the amplified versions of the received signals to the RF circuitry 720 for further processing. The FEM circuitry 730 may also include a transmit signal path which may include circuitry configured to amplify signals for transmission provided by the RF circuitry 720 for transmission by one or more of the one or more antennas 732. In various embodiments, the amplification through the transmit or receive signal paths may be done solely in the RF circuitry 720, solely in the FEM circuitry 730, or in both the RF circuitry 720 and the FEM circuitry 730.

In some embodiments, the FEM circuitry 730 may include a TX/RX switch to switch between transmit mode and receive mode operation. The FEM circuitry 730 may include a receive signal path and a transmit signal path. The receive signal path of the FEM circuitry 730 may include an LNA to amplify received RF signals and provide the amplified received RF signals as an output (e.g., to the RF circuitry 720). The transmit signal path of the FEM circuitry 730 may include a power amplifier (PA) to amplify input RF signals (e.g., provided by the RF circuitry 720), and one or more filters to generate RF signals for subsequent transmission (e.g., by one or more of the one or more antennas 732).

In some embodiments, the PMC 734 may manage power provided to the baseband circuitry 704. In particular, the PMC 734 may control power-source selection, voltage scaling, battery charging, or DC-to-DC conversion. The PMC 734 may often be included when the device 700 is capable of being powered by a battery, for example, when the device 700 is included in a UE. The PMC 734 may increase the power conversion efficiency while providing desirable implementation size and heat dissipation characteristics.

FIG. 7 shows the PMC 734 coupled only with the baseband circuitry 704. However, in other embodiments, the PMC 734 may be additionally or alternatively coupled with, and perform similar power management operations for, other components such as, but not limited to, the application circuitry 702, the RF circuitry 720, or the FEM circuitry 730.

In some embodiments, the PMC 734 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used to execute Layer 3, Layer 2, or Layer 1 functionality, while processors of the application circuitry 702 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
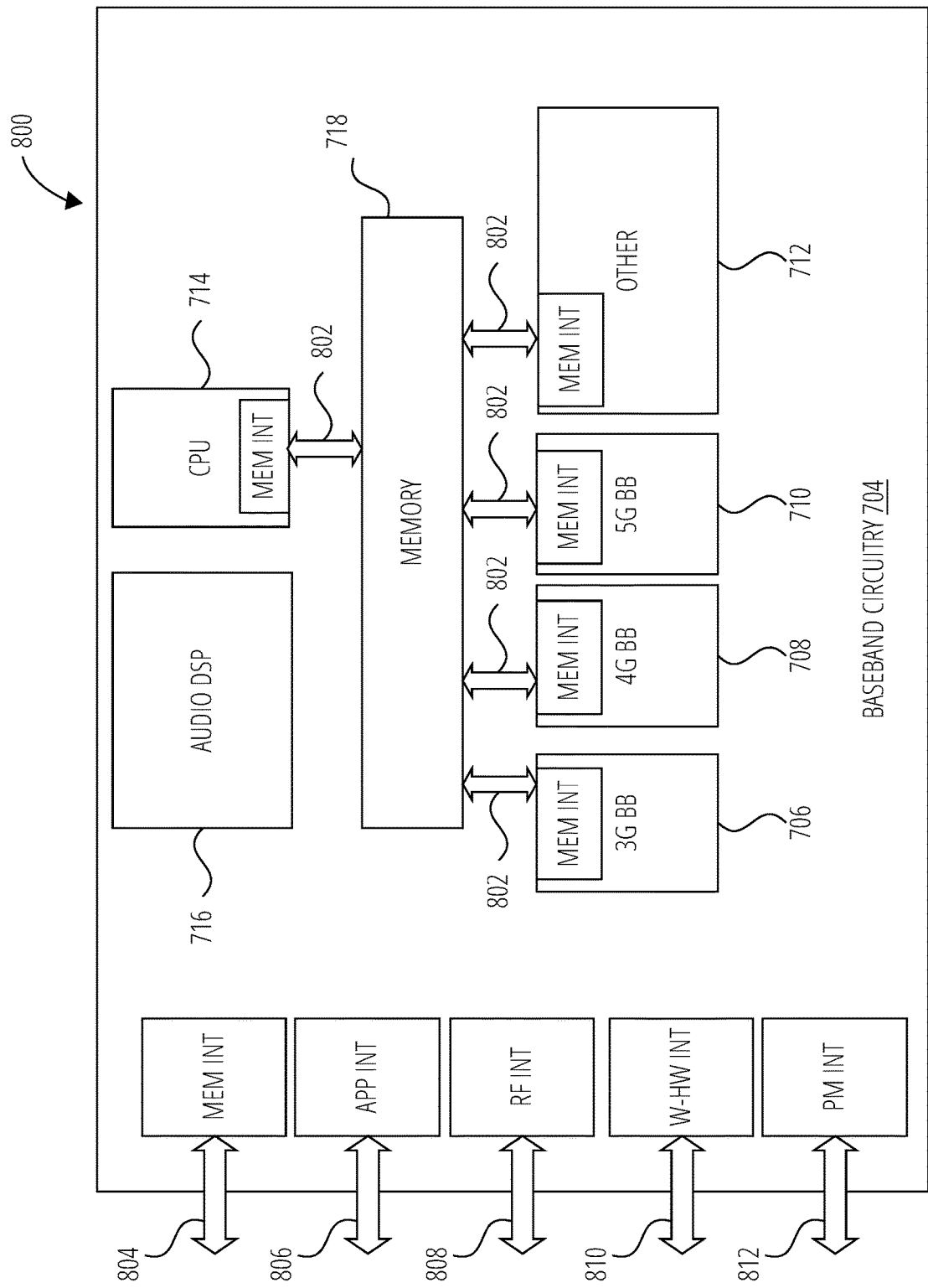
FIG. 8 illustrates an example interfaces in accordance with one embodiment.

FIG. 8 illustrates example interfaces 800 of baseband circuitry in accordance with some embodiments. As discussed above, the baseband circuitry 704 of FIG. 7 may comprise 3G baseband processor 706, 4G baseband processor 708, 5G baseband processor 710, other baseband processor(s) 712, CPU 714, and a memory 718 utilized by said processors. As illustrated, each of the processors may include a respective memory interface 802 to send/receive data to/from the memory 718.

The baseband circuitry 704 may further include one or more interfaces to communicatively couple to other circuitries/devices, such as a memory interface 804 (e.g., an interface to send/receive data to/from memory external to the baseband circuitry 704), an application circuitry interface 806 (e.g., an interface to send/receive data to/from the application circuitry 702 of FIG. 7), an RF circuitry interface 808 (e.g., an interface to send/receive data to/from RF circuitry 720 of FIG. 7), a wireless hardware connectivity interface 810 (e.g., an interface to send/receive data to/from Near Field Communication (NFC) components, Bluetooth® components (e.g., Bluetooth® Low Energy), Wi-Fi® components, and other communication components), and a power management interface 812 (e.g., an interface to send/receive power or control signals to/from the PMC 734.

Figure 9:
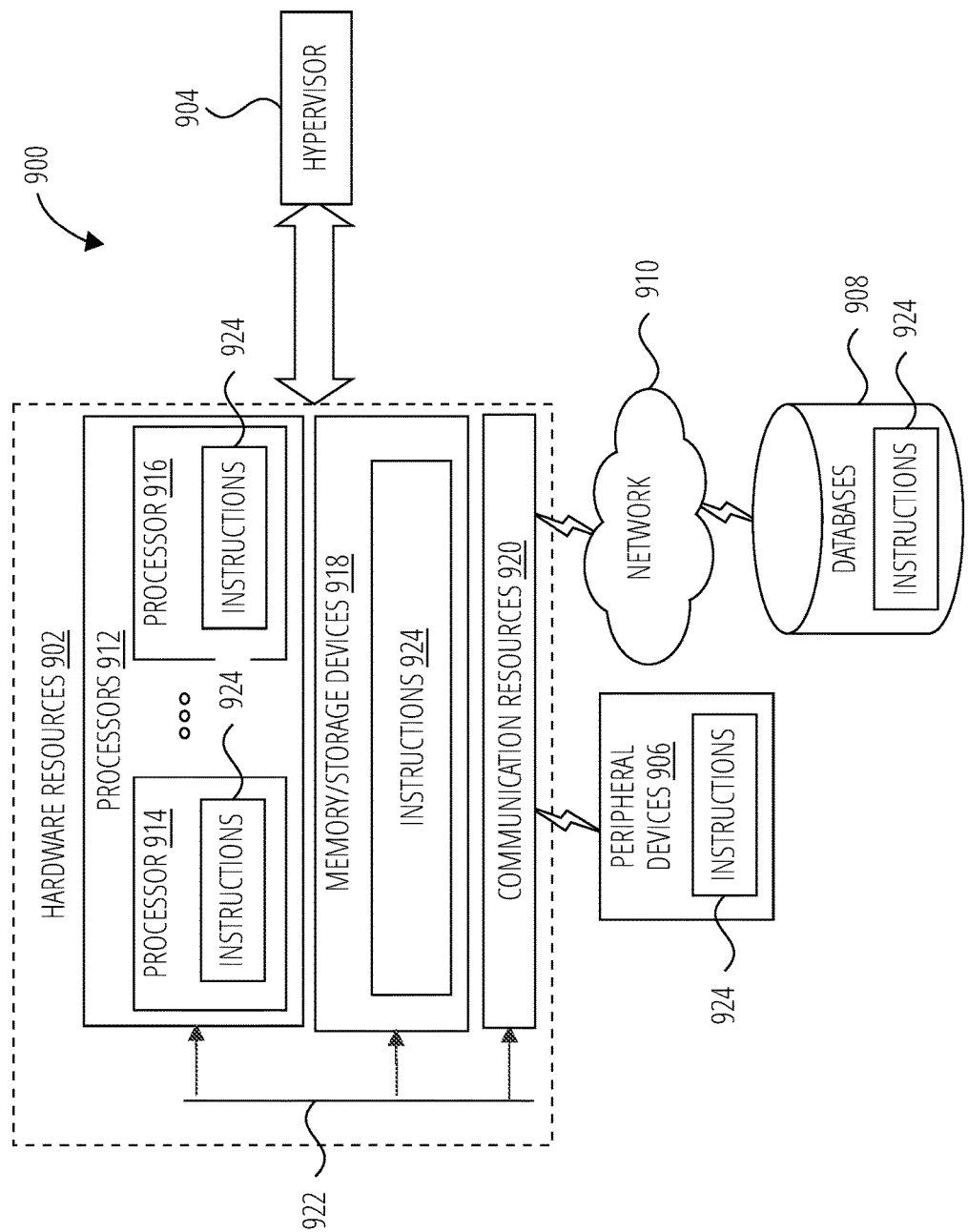
FIG. 9 illustrates components in accordance with one embodiment.

FIG. 9 is a block diagram illustrating components 900, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 902 including one or more processors 912 (or processor cores), one or more memory/storage devices 918, and one or more communication resources 920, each of which may be communicatively coupled via a bus 922. For embodiments where node virtualization (e.g., NFV) is utilized, a hypervisor 904 may be executed to provide an execution environment for one or more network slices/sub-slices to utilize the hardware resources 902.

The processors 912 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 914 and a processor 916.

The memory/storage devices 918 may include main memory, disk storage, or any suitable combination thereof. The memory/storage devices 918 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 920 may include interconnection or network interface components or other suitable devices to communicate with one or more peripheral devices 906 or one or more databases 908 via a network 910. For example, the communication resources 920 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 924 may comprise software, a program, an application, an applet, an app, or other executable code for causing at least any of the processors 912 to perform any one or more of the methodologies discussed herein. The instructions 924 may reside, completely or partially, within at least one of the processors 912 (e.g., within the processor's cache memory), the memory/storage devices 918, or any suitable combination thereof. Furthermore, any portion of the instructions 924 may be transferred to the hardware resources 902 from any combination of the peripheral devices 906 or the databases 908. Accordingly, the memory of the processors 912, the memory/storage devices 918, the peripheral devices 906, and the databases 908 are examples of computer-readable and machine-readable media.

V. Additional Examples

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is an apparatus for a user equipment (UE), the apparatus comprising a memory interface and a processor. The memory interface to send or receive, to or from a memory device, data correspond to hybrid automatic repeat request (HARQ) feedback. The processor to: process repetitions of a physical downlink shared channel (PDSCH) transmission; determine a fewest number of the repetitions used by the UE to decode the PDSCH transmission; and generate the HARQ feedback in response to the PDSCH transmission, the HARQ feedback indicating the fewest number of the repetitions used by the UE to decode the PDSCH transmission.

Example 2 is the apparatus of Example 1, wherein the processor is further configured to: determine that four or more of the repetitions have been scheduled for the PDSCH transmission; and in response to the determination that the four or more of the repetitions have been scheduled for the PDSCH transmission, generate the HARQ feedback using a HARQ-value mapping comprising: HARQ value 0 to indicate a negative acknowledgement (NACK); HARQ value 1 to indicate an acknowledgement (ACK) with up to a quarter of the repetitions used by the UE to decode the PDSCH transmission; HARQ value 2 to indicate an ACK with up to half of the repetitions used by the UE to decode the PDSCH transmission; and HARQ value 3 to indicate an ACK with more than half of the repetitions used by the UE to decode the PDSCH transmission.

Example 3 is the apparatus of Example 2, wherein the processor is further configured to configure the UE with at least four physical uplink control channel (PUCCH) sequences corresponding to respectively different HARQ values.

Example 4 is the apparatus of Example 2, wherein to generate the HARQ feedback comprises generating a physical uplink control channel (PUCCH) format 0 sequence where m defines a cyclic shift value, and wherein: m=0 corresponds to the HARQ value 0; m=3 corresponds to the HARQ value 1; m=6 corresponds to the HARQ value 2; and m=9 corresponds to the HARQ value 3.

Example 5 is the apparatus of Example 1, wherein the processor is further configured to generate the HARQ feedback using a HARQ-value mapping comprising: HARQ value 0 to indicate a negative acknowledgement (NACK); HARQ value 1 to indicate an acknowledgement (ACK) with up to half of the repetitions used by the UE to decode the PDSCH transmission; and HARQ value 2 to indicate an ACK with more than half or all of the repetitions used by the UE to decode the PDSCH transmission.

Example 6 is the apparatus of Example 5, wherein the processor is further configured to configure the UE with three physical uplink control channel (PUCCH) sequences corresponding to respectively different HARQ values.

Example 7 is the apparatus of Example 5, wherein to generate the HARQ feedback comprises generating a physical uplink control channel (PUCCH) format 0 sequence where m defines a cyclic shift value, and wherein: m=0 corresponds to the HARQ value 0; m=4 corresponds to the HARQ value 1; and m=8 corresponds to the HARQ value 2.

Example 8 is the apparatus of Example 1, wherein the PDSCH transmission is configured for PDSCH data map type B such that a scheduled PDSCH is not aligned with a slot boundary, wherein the processor is further configured to determine the scheduled PDSCH with repetition by mini-slot based physical downlink control channel (PDCCH) scheduling a single PDSCH spanning a plurality of mini-slots corresponding to a total time duration of a plurality of repetitions.

Example 9 is the apparatus of Example 1, wherein the processor is further configured to process a radio resource control (RRC) signal to determine whether to enable the HARQ feedback to use multiple values for the repetitions of the PDSCH.

Example 10 is the apparatus of Example 9, wherein to process the RRC signal comprises to determine an RRC parameter indicating use of one of a 2-value HARQ feedback corresponding to a 1-bit HARQ feedback, a 3-value HARQ feedback, and a 4-value HARQ feedback.

Example 11 is the apparatus of Example 1, wherein the processor is further configured to: process a radio resource control (RRC) signal from a base station to determine a maximum number of repetitions for scheduled data transmission; generate channel state information (CSI) for the base station; and determine an actual number of repetitions used by the base station based on the CSI for the scheduled data transmission, wherein the actual number of repetitions is not more than the maximum number of repetitions.

Example 12 is the apparatus of Example 11, wherein to determine the actual number of repetitions comprises to process a physical downlink control channel (PDCCH) scheduling the data transmission.

Example 13 is the apparatus of Example 11, wherein to determine the actual number of repetitions comprises to decode downlink control information (DCI) indicating the actual number of repetitions.

Example 14 is the apparatus of Example 13, wherein the processor is further configured to use a single DCI bit to determine the actual number of repetitions, wherein a first value of the single DCI bit indicates use of half of the maximum number of repetitions, and where a second value of the single DCI bit indicates use of the maximum number of repetitions.

Example 15 is the apparatus of Example 13, wherein the processor is further configured to use a 2-bit repetition field in the DCI to determine the actual number of repetitions, wherein a first value of the 2-bit repetition field indicates use of a quarter of the maximum number of repetitions, a second value of the 2-bit repetition field indicates use of half of the maximum number of repetitions, and a third value of the 2-bit repetition field indicates use of the maximum number of repetitions.

Example 16 is a computer-readable storage medium, the computer-readable storage medium including instructions that when executed by a processor of a node in a wireless network, cause the processor to: schedule a first physical downlink shared channel (PDSCH) transmission with a first number of repetitions for a user equipment (UE); process hybrid automatic repeat request (HARQ) feedback corresponding to the first PDSCH transmission from the UE; determine, from the HARQ feedback, a second number of repetitions used by the UE to decode the first PDSCH transmission; and schedule a second PDSCH transmission for the UE based on the second number of repetitions.

Example 17 is the computer-readable storage medium of Example 16, wherein the HARQ feedback indicates that the second number is one of a quarter of the first number, a half of the first number, or is equal to the first number.

Example 18 is the computer-readable storage medium of Example 16, wherein the HARQ feedback comprises a physical uplink control channel (PUCCH) format 0 including a cyclic shift corresponding to the second value.

Example 19 is the computer-readable storage medium of Example 16, wherein the instructions further configure the processor to generate a radio resource control (RRC) signal to enable the UE for multi-value HARQ acknowledgment (ACK) feedback for PDSCH with repetition.

Example 20 is the computer-readable storage medium of Example 19, wherein the RRC signal comprises an RRC parameter to indicate use of one of a 2-value HARQ feedback corresponding to a 1-bit HARQ feedback, a 3-value HARQ feedback, and a 4-value HARQ feedback.

Example 21 is the computer-readable storage medium of Example 16, wherein the instructions further configure the processor to: generate a radio resource control (RRC) signal to indicate to the UE a maximum number of repetitions for scheduled data transmission; process channel state information (CSI) from the UE; and based on the CSI, determine an actual number of repetitions for the scheduled data transmission.

Example 22 is the computer-readable storage medium of Example 21, wherein the instructions further configure the processor to generate a physical downlink control channel (PDCCH) to schedule the data transmission, wherein the PDCCH indicates the actual number of repetitions.

Example 23 is the computer-readable storage medium of Example 22, wherein the instructions further configure the processor to generate downlink control information (DCI) indicating the actual number of repetitions.

Example 24 is the computer-readable storage medium of Example 23, wherein the DCI comprises a single DCI bit to indicate the actual number of repetitions, wherein a first value of the single DCI bit indicates use of half of the maximum number of repetitions, and where a second value of the single DCI bit indicates use of the maximum number of repetitions.

Example 25 is the computer-readable storage medium of Example 23, wherein the DCI comprises a 2-bit repetition field to indicate the actual number of repetitions, wherein a first value of the 2-bit repetition field indicates use of a quarter of the maximum number of repetitions, a second value of the 2-bit repetition field indicates use of half of the maximum number of repetitions, and a third value of the 2-bit repetition field indicates use of the maximum number of repetitions.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. An apparatus for a user equipment (UE), the apparatus comprising:
a memory interface to send or receive, to or from a memory device, data correspond to hybrid automatic repeat request (HARQ) feedback; and
a processor to:
process repetitions of a physical downlink shared channel (PDSCH) transmission;
determine a fewest number of the repetitions used by the UE to decode the PDSCH transmission;
determine that four or more of the repetitions have been scheduled for the PDSCH transmission; and
generate the HARQ feedback in response to the PDSCH transmission, the HARQ feedback indicating the fewest number of the repetitions used by the UE to decode the PDSCH transmission, wherein in response to the determination that the four or more of the repetitions have been scheduled for the PDSCH transmission, the processor is further configured to generate the HARQ feedback using a HARQ-value mapping comprising:
HARQ value 0 to indicate a negative acknowledgement (NACK);
HARQ value 1 to indicate an acknowledgement (ACK) with up to a quarter of the repetitions used by the UE to decode the PDSCH transmission;
HARQ value 2 to indicate an ACK with up to half of the repetitions used by the UE to decode the PDSCH transmission; and
HARQ value 3 to indicate an ACK with more than half of the repetitions used by the UE to decode the PDSCH transmission.

2. The apparatus of claim 1, wherein the processor is further configured to configure the UE with at least four physical uplink control channel (PUCCH) sequences corresponding to respectively different HARQ values.

3. The apparatus of claim 1, wherein to generate the HARQ feedback comprises generating a physical uplink control channel (PUCCH) format 0 sequence where m defines a cyclic shift value, and wherein:
m=0 corresponds to the HARQ value 0;
m=3 corresponds to the HARQ value 1;
m=6 corresponds to the HARQ value 2; and
m=9 corresponds to the HARQ value 3.

4. The apparatus of claim 1, wherein the PDSCH transmission is configured for PDSCH data map type B such that a scheduled PDSCH is not aligned with a slot boundary, wherein the processor is further configured to determine the scheduled PDSCH with repetition by mini-slot based physical downlink control channel (PDCCH) scheduling a single PDSCH spanning a plurality of mini-slots corresponding to a total time duration of a plurality of repetitions.

5. The apparatus of claim 1, wherein the processor is further configured to process a radio resource control (RRC) signal to determine whether to enable the HARQ feedback to use multiple values for the repetitions of the PDSCH transmission.

6. The apparatus of claim 5, wherein to process the RRC signal comprises to determine an RRC parameter indicating use of a 4-value HARQ feedback.

7. The apparatus of claim 1, wherein the processor is further configured to:
process a radio resource control (RRC) signal from a base station to determine a maximum number of repetitions for scheduled data transmission;
generate channel state information (CSI) for the base station; and
determine an actual number of repetitions used by the base station based on the CSI for the scheduled data transmission, wherein the actual number of repetitions is not more than the maximum number of repetitions.

8. The apparatus of claim 7, wherein to determine the actual number of repetitions comprises to process a physical downlink control channel (PDCCH) scheduling the data transmission.

9. The apparatus of claim 7, wherein to determine the actual number of repetitions comprises to decode downlink control information (DCI) indicating the actual number of repetitions.

10. The apparatus of claim 9, wherein the processor is further configured to use a single DCI bit to determine the actual number of repetitions, wherein a first value of the single DCI bit indicates use of half of the maximum number of repetitions, and where a second value of the single DCI bit indicates use of the maximum number of repetitions.

11. The apparatus of claim 9, wherein the processor is further configured to use a 2-bit repetition field in the DCI to determine the actual number of repetitions, wherein a first value of the 2-bit repetition field indicates use of a quarter of the maximum number of repetitions, a second value of the 2-bit repetition field indicates use of half of the maximum number of repetitions, and a third value of the 2-bit repetition field indicates use of the maximum number of repetitions.

12. A non-transitory computer-readable storage medium, the non-transitory computer-readable storage medium including instructions that when executed by a processor of a node in a wireless network, cause the processor to:
schedule a first physical downlink shared channel (PDSCH) transmission with a first number of repetitions for a user equipment (UE);
process hybrid automatic repeat request (HARQ) feedback corresponding to the first PDSCH transmission from the UE;
determine, from the HARQ feedback, a second number of repetitions used by the UE to decode the first PDSCH transmission, wherein the HARQ feedback comprises a physical uplink control channel (PUCCH) format 0 including a cyclic shift corresponding to the second number; and
schedule a second PDSCH transmission for the UE based on the second number of repetitions.

13. The non-transitory computer-readable storage medium of claim 12, wherein the HARQ feedback indicates that the second number is one of a quarter of the first number, a half of the first number, or is equal to the first number.

14. The non-transitory computer-readable storage medium of claim 12, wherein the instructions further configure the processor to generate a radio resource control (RRC) signal to enable the UE for multi-value HARQ acknowledgment (ACK) feedback for PDSCH with repetition.

15. The non-transitory computer-readable storage medium of claim 14, wherein the RRC signal comprises an RRC parameter to indicate use of one of a 2-value HARQ feedback corresponding to a 1-bit HARQ feedback, a 3-value HARQ feedback, and a 4-value HARQ feedback.

16. An apparatus for a user equipment (UE), the apparatus comprising:
a memory interface to send or receive, to or from a memory device, data correspond to hybrid automatic repeat request (HARQ) feedback; and
a processor to:
process repetitions of a physical downlink shared channel (PDSCH) transmission;
determine a fewest number of the repetitions used by the UE to decode the PDSCH transmission; and
generate the HARQ feedback in response to the PDSCH transmission, the HARQ feedback indicating the fewest number of the repetitions used by the UE to decode the PDSCH transmission, wherein the processor is further configured to generate the HARQ feedback using a HARQ-value mapping comprising:
HARQ value 0 to indicate a negative acknowledgement (NACK);
HARQ value 1 to indicate an acknowledgement (ACK) with up to half of the repetitions used by the UE to decode the PDSCH transmission; and
HARQ value 2 to indicate an ACK with more than half or all of the repetitions used by the UE to decode the PDSCH transmission.

17. The apparatus of claim 16, wherein the processor is further configured to configure the UE with three physical uplink control channel (PUCCH) sequences corresponding to respectively different HARQ values.

18. The apparatus of claim 16, wherein to generate the HARQ feedback comprises generating a physical uplink control channel (PUCCH) format 0 sequence where m defines a cyclic shift value, and wherein:
m=0 corresponds to the HARQ value 0;
m=4 corresponds to the HARQ value 1; and
m=8 corresponds to the HARQ value 2.

19. The apparatus of claim 16, wherein the PDSCH transmission is configured for PDSCH data map type B such that a scheduled PDSCH is not aligned with a slot boundary, wherein the processor is further configured to determine the scheduled PDSCH with repetition by mini-slot based physical downlink control channel (PDCCH) scheduling a single PDSCH spanning a plurality of mini-slots corresponding to a total time duration of a plurality of repetitions.

20. The apparatus of claim 16, wherein the processor is further configured to process a radio resource control (RRC) signal to determine whether to enable the HARQ feedback to use multiple values for the repetitions of the PDSCH transmission.

* * * * *